United States Patent [19]

Murata

[11] Patent Number: 4,644,492

[45] Date of Patent: Feb. 17, 1987

[54] PLURAL MODE LANGUAGE TRANSLATOR HAVING FORMATTING CIRCUITRY FOR ARRANGING TRANSLATED WORDS IN DIFFERENT ORDERS

[75] Inventor: Hiroshi Murata, Fujisawa, Japan

[73] Assignee: Canon Kabushiki Kaisha, Tokyo, Japan

[21] Appl. No.: 844,232

[22] Filed: Mar. 24, 1986

Related U.S. Application Data

[63] Continuation of Ser. No. 594,407, Mar. 28, 1984, abandoned, which is a continuation of Ser. No. 192,220, Sep. 30, 1980, abandoned.

[30] Foreign Application Priority Data

Oct. 5, 1979 [JP] Japan .............................. 54-129045

[51] Int. Cl.⁴ .............................................. G06F 15/38
[52] U.S. Cl. .................................... 364/900; 364/419
[58] Field of Search ... 364/200 MS File, 900 MS File, 364/419; 434/157

[56] References Cited

U.S. PATENT DOCUMENTS 4,158,236  6/1979  Levy .................................. 364/900
4,159,536  6/1979  Kehoe et al. ...................... 364/900
4,218,760  8/1980  Levy .................................. 364/900
4,393,460  7/1983  Masuzawa et al. ................ 364/900

FOREIGN PATENT DOCUMENTS 2446517  1/1979  France ............................. 364/900
1448211  9/1976  United Kingdom .............. 364/900
2014765  8/1979  United Kingdom ............. 179/1 SM
1596411  8/1981  United Kingdom .............. 364/900

OTHER PUBLICATIONS

S. Takahashi et al., *English–Japanese Machine Translation*, Proceedings of the Int'l. Conf. on Information Processing (Paris Jun. 15-20, 1959), pp. 194-199.

*Primary Examiner*—Archie E. Williams
*Attorney, Agent, or Firm*—Fitzpatrick, Cella, Harper & Scinto

[57] ABSTRACT

An electronic translator includes an input device entering words of a first language, a convertor connected to the input device to convert words of the first language entered from the input device into words of a second language, and circuitry for arranging the words of the second language obtained from the converter in accordance with a format specific to the second language.

13 Claims, 2 Drawing Figures

PLURAL MODE LANGUAGE TRANSLATOR HAVING FORMATTING CIRCUITRY FOR ARRANGING TRANSLATED WORDS IN DIFFERENT ORDERS

This application is a continuation of application Ser. No. 594,407 filed Mar. 28, 1984, now abandoned, which is a continuation of application Ser. No. 192,220 filed Sept. 30, 1980, now abandoned.

BACKGROUND OF THE INVENTION

1. Field of the Invention

The present invention relates to an electronic translator apparatus, and more particularly to such apparatus giving output in a form which is common or popular in a designated particular country.

2. Description of the Prior Art

The remarkable progress of the semiconductor integration circuit technology in recent years has resulted in a rapid increase in semiconductor memory capacity per chip, and has enabled the commercialization of compact electronic translator apparatus which was considered almost impossible to realize. In such translators, the result of the translation is given by any audible or visual display but without any means for producing a hard copy of such translation resulting. It has therefore been desired to combine such translator vocal output with a printer, but such combination has not yet been realized or, if realized, was still incomplete, since for example it has been unable to provide the result of the translation in a form or format that is common in a country to which the translated language is directed to.

SUMMARY OF THE INVENTION

In consideration of the circumstances, an object of the present invention is to provide an electronic translator apparatus having a printer, in which one can arbitrarily change a print format in response to actuation of particular keys.

More specifically, in consideration of the fact that a common format of letters or official documents is different from country to country, it is another object of the invention to provide an electronic translator apparatus providing results of translation in a printed format common in a specified country in response to particular keys such as country selecting keys a letter mode key, a point key, etc.

Another object of the present invention is to provide an electronic translator apparatus comprising input means for entering words of a first language, converting means combined with said input means to convert words of said first language entered from said input means into words of a second language, and arranging means combined with said converting means to arrange the words of said second language obtained by the conversion by said converting means in a format specific to said second language.

BRIEF DESCRIPTION OF THE DRAWINGS

The foregoing and other objects of the present invention will be made more apparent from the following description of the preferred embodiments thereof to be taken in conjunction with the accompanying drawings, in which.

DESCRIPTION OF THE PREFERRED EMBODIMENTS

Figure 1:
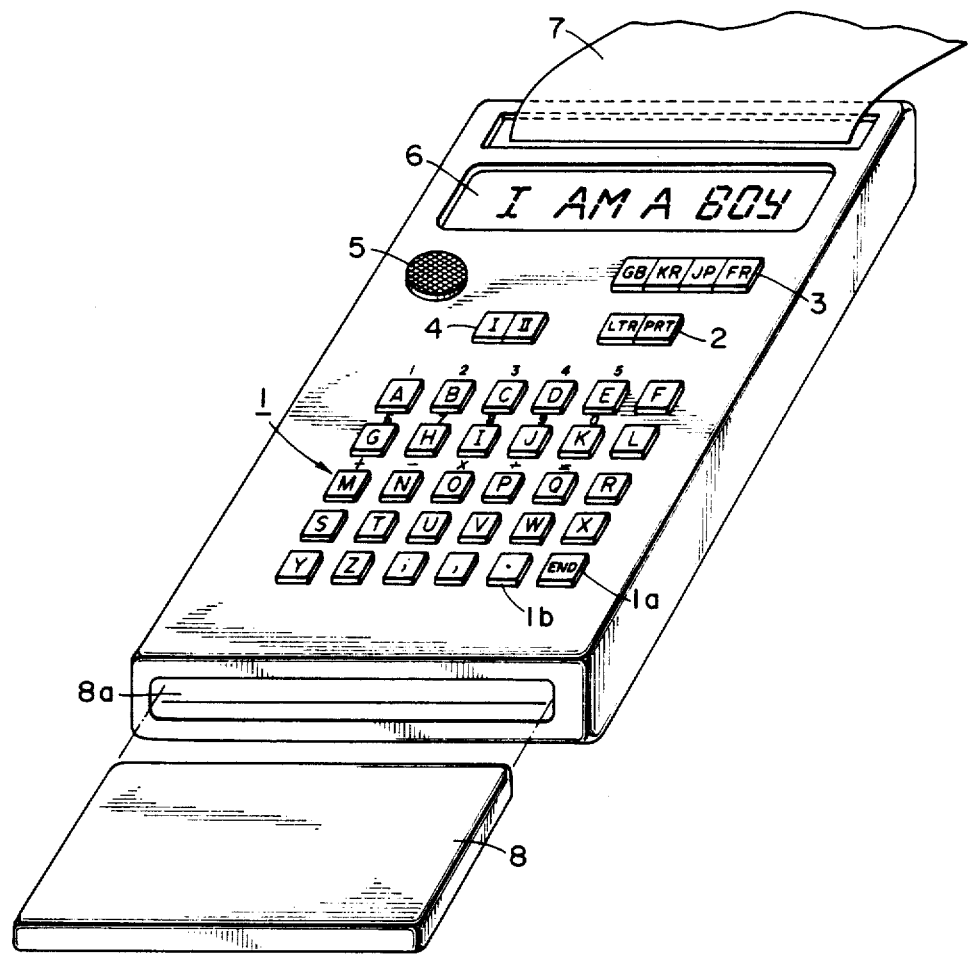
FIG. 1 is a schematic perspective view showing an embodiment of the translator with a printer according to the present invention.

FIG. 1 shows an embodiment of the translator of the present invention in a schematic perspective view, wherein the translator is provided with a group of keys 1 including alphabet keys A–Z, numeral keys 0–9 and function keys +, −, ×, ÷, etc. At the lower right corner of the group of keys there is shown an END key 1a to be actuated after the input of a word of the language to be translated, whereby the alphabetic information entered by the keys up to this point is processed as a word in the translated language. Also provided is a point or period key 1b to be actuated after the input of a sentence in the language to be translated, whereby the words entered by the keys up to this point are processed as a sentence in the translated language. The translated language thus obtained as a word or a sentence is produced in voice signals from a loud speaker 5.

Also at the upper right of the group keys 1 there is provided a LETTER-PRINT mode selector key 2 which, in the print mode, provides the result of the translation in a successive order not restricted by a particular format and, in the letter mode, provide the result in a format which is common or popular in a country designated by the country selecting keys, which will be explained later. Above the mode selector key 2 in the figure there is provided country selecting keys 3 for designating formats commin in various countries.

In FIG. 1, country selecting keys 3 are provided for four countries of Great Britain GB, Korea KR, Japan JP and France FR, but this combination is merely shown as an example and does not limit the present invention.

The translator in accordance with the present invention is further provided with a key 4 for selecting the function mode of the group of keys 1. This key 4 has two positions I and II, and causes, for example in the mode I, the group of keys 1 to enter twenty-six alphabetic letters A–Z while, in the mode II, to enter numerals 0–9 through corresponding keys. Results of translation are given by voice signals through the loud speaker 5. There is also provided a known dot-type or segment-type visual display device 6 composed of liquid crystal display devices or light-emitting diodes for displaying input information or results of translation.

At the front face of the translator there is provided an insert slot 8a for accepting a cassette 8 storing words and idiomatic phrases of the English, Japanese, Korean and French languages. A printing sheet 7 is mounted on the translator for printing thereon results of translation in the ordinary print mode or in the letter mode only in case the LETTER-PRINT mode selector key 2 is placed at either of two positions thereof.

Figure 2:
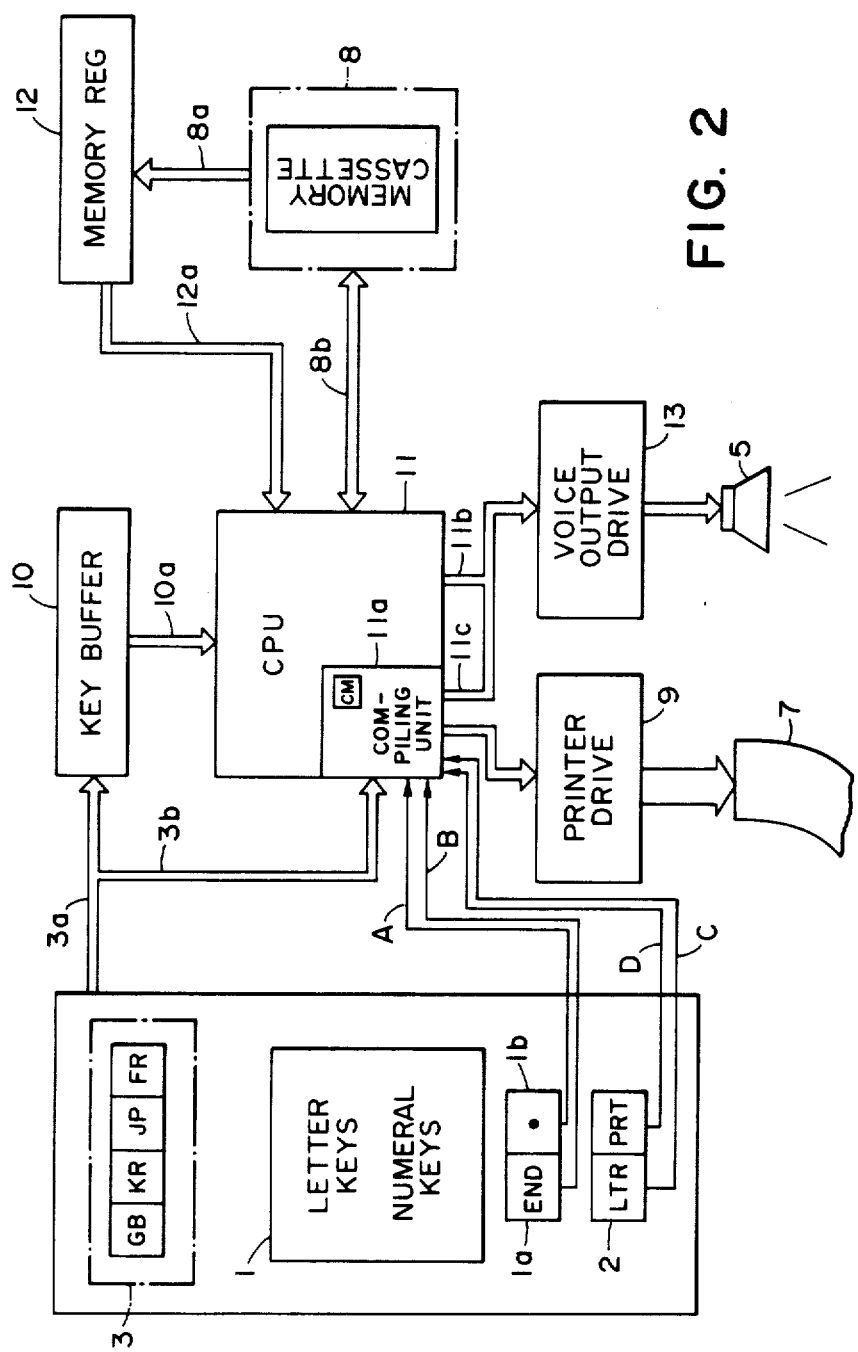
FIG. 2 is a schematic logic block diagram employed in the translator shown in FIG. 1.

Now reference is mode to FIG. 2 showing the logic circuit structure of the translator of the present invention in a block diagram, wherein the components that are the same as those in FIG. 1 are represented by the same reference numerals. Thus here are shown alphabetic letter keys and numeral keys 1, a LETTER-PRINT mode selector key 2, country selecting keys 3, loud speaker 5, a word memory cartridge 8, an END key 1a, a point key 1b and a printer drive.

The signals generated in response to key operations are supplied over a signal line 3a to a key buffer 10 for temporary storage, and are also supplied over a signal line 3b to a compiling unit 11a provided in a central process or unit CPU. Compiling unit 11a is provided with a memory CM for storing format information of various countries, which information is read out in response to the country selecting keys 3 to control the output of the translated language. The processor unit 11 selects the addresses of a memory contained in the unit in response to the information supplied from the key buffer 10 on a signal line 10a and executes the instructions stored in such addresses. Also the processor unit 11 senses, on a signal line 8b, insertion of the memory cassette 8 into the translator, and sends an instruction in a address selected by the key buffer 10 to the memory cassette 8 for sending, on a word basis, the language information stored therein associated with that address to memory register 12 through the signal line 8a. Also the information stored in memory register 12 is sent on a signal line 12a to the processor unit 11.

The END key 1a is connected by a signal line A to the compiling unit 11a of the processor unit 11, and, when actuated after the entry of a word of the language to be translated, causes processor unit 11 to compile a corresponding word in the translated language. Similarly, the point key 1b is connected by a signal line B to compiling unit 11a, and, when actuated after the entry of sentence of the language to be translated, causes the compiling unit 11a to compile a corresponding sentence in the translated language.

The information in the translated language from the memory register 12 or the word or sentence compiled in the compiling unit 11a is transmitted on signal lines 11b, 11c to a voice output drive 13 under the control of the process or unit 11 and produced as audible signals from the speaker 5. The same information is also displayed on the display 6 though it is not represented in FIG. 2.

The LETTER-PRINT selector key 2 is connected by signal lines C, D to the compiling unit 11a of the processor or unit 11. When key 2 is in the letter mode, the compiling unit 11a reads out a required format from the memory CM, compiles the translated language in the format specific thereto (for example, in the case of Japanese language, placing the month and day after the year in dating or indenting a space for one character at the start of each paragraph), and sends the thus compiled words in succession to the printer drive 9 under the control of the process or unit 11, thereby printing them on the print sheet 7 for example in a format of a letter specific to the country of the translated language. On the other hand, in the print mode, the printing is conducted in the usual manner without such format compilation.

Now there will be explained in detail the operations of the above-explained translator.

As the present embodiment has a alphabetic keys the entry of language information other than English or French is to be made in phonetic representations. As an example, in the case of translating Japanese into English, a memory cassette 8 storing the English words and phrases is inserted into a cassette slot 8a provided on the front face of the translator, whereby the insertion is sensed by the process or unit 11 by means of a signal transmitted over the signal line 8b. LETTER-PRINT selector key 2 is positioned at the letter mode, a country selecting key corresponding to English is the actuated, and the mode selector key 4 is positioned at the mode I or alphabetic input mode. The signals produced in response to those keys are transmitted through the key buffer 10 to the process or unit 11, which thus executes the corresponding instructions.

Then the content of a Japanese letter to be translated is entered in alphabetic representation from the group of keys 1, wherein the entered Japanese language is stored in the key buffer on a word basis upon each actuation of the END key 1a. In response to the actuation of END key 1a, an addressing instruction associated with the content stored in the key buffer 10 is forwarded to the memory cassette 8, and the English information associated with that address is in turn transferred to the memory register 12.

This English information is further transmitted to the process or unit 11 to generate signals for driving the voice output drive 13 for causing vocal output to be produced, and is compiled, if necessary, in the compiling unit 11a as a word for simultaneous display on the display device 6.

After the input of Japanese information in the above-mentioned manner, the point key 1b is actuated at the end of a sentence, whereby the compiling unit 11a of the process or unit 11 compiles the English information corresponding to the Japanese information entered up to this point as a sentence and prints out thus compiled English information on the printing sheet 7 in a format specific to the English-speaking countries. In this manner the printer drive 9 is activated by a printer drive signal generated in response to each actuation of the point key 1b, thereby providing a printed output of a sentence according to the format of English letter. Also in response to the actuation of point key 1b, the voice output drive 13 causes the thus compiled English sentence to be produced from the speaker 5, thus enabling oral confirmation of the words on a sentence basis in the manner similar to the oral confirmation of a word on a word basis which is encountered when the end key 1a is actuated.

When the LETTER-PRINT selector key 2 is positioned at the print mode, the translated English data are printed out in the order of input without a particular format used.

Though the foregoing explanation has been directed to the case of translation from Japanese to English, it is possible to obtain translation and printing in the same manner in any combination of two of the following four languages, English, Korean, Japanese and French.

As discussed in the foregoing, the present invention allows a form or format to be designated which is popular in a certain country by merely depressing a country selecting key or a letter mode key, and translation and printing to be obtained on a sentence basis by the point key, thus eliminating the additional typewriting or handwriting as was necessitated in the conventional printer. Also it is rendered possible, by this additional function of format selection to the translator, to convert for example the format in Japanese language into that in a foreign language and to prepare letters or documents in a form which is common or popular in the country using the translated language.

In the foregoing embodiment the translator is provided therein with the printer, but such a printer may also be separated from the translator, in which case the translator produces the signals in a format required in the translated language.

What I claim is:

1. An electronic translator, comprising:
   input means for entering words of a first language;

mode input means for selectively entering either a first mode signal or a second mode signal;

converting means connected to said input means for converting the words of the first language entered from said input means into words of a second language; and arranging means connected to said converting means and said mode input means, for arranging the words of the second language obtained from said converting means in a first order in response to said first mode signal entered from said mode input means, and for arranging the words of the second language obtained from said converting means in a second order obtained from said converting means in response to said second mode signal entered from said mode input means.

2. An electronic translator according to claim 1, further comprising visualizing means for providing a visual display of the words of the second language arranged by said arranging means.

3. An electronic translator according to claim 2, further comprising vocal output means for providing a voice output of the words of the second language arranged by said arranging means.

4. An electronic translator according to claim 1, wherein said arranging means includes a memory for storing information in the first order obtained from said converting means.

5. An electronic translator according to claim 4, wherein said input means includes means for designating translation of the first language to the second language.

6. An electronic translator according to claim 5, wherein said arranging means is operative in response to said designating means.

7. An electronic translator according to claim 5, wherein said designating means includes a plurality of keys.

8. An electronic translator according to claim 1, wherein said converting means includes a memory cassette removably and electrically connected to said electronic translator, said memory cassette having the words of said second language therein.

9. An electronic translator, comprising:

input means for entering words of a first language;

a plurality of selecting keys for designating translation of the first language to a second language;

converting means connected to said plurality of selecting keys and said input means for converting the words of the first language entered from said input means into words of the second language; and arranging means, operable in a first mode and in a second mode, connected to said converting means for arranging the words of the second language obtained from said converting means in a first order in the first mode, and for arranging the words of the second language obtained from said converting means in a second order obtained from said converting means in the second mode.

10. An electronic translator according to claim 1, wherein converting means includes a dictionary memory removably and electrically connected to said electronic translator, said dictionary memory having the words of said second language therein.

11. An electronic translator according to claim 1, wherein said mode input means includes at least a manually operable input switch.

12. An electronic translator according to claim 11, further comprising visualizing means for visualizing the words as arranged by said arranging means.

13. An electronic translator according to claim 11, wherein said input means includes means for entering a period and means for driving said converting means in response to said means for entering said period.

* * * * *